United States Patent
Wang et al.

(10) Patent No.: US 12,099,753 B2
(45) Date of Patent: Sep. 24, 2024

(54) MAPPING TABLE UPDATING METHOD, MEMORY STORAGE DEVICE AND MEMORY CONTROL CIRCUIT UNIT

(71) Applicant: Hefei Core Storage Electronic Limited, Anhui (CN)

(72) Inventors: Chih-Ling Wang, Anhui (CN); Ya Jie Guo, Henan (CN); En Yang Wang, Anhui (CN); Kuai Cao, Anhui (CN); Dong Dong Yao, Anhui (CN); Yun Peng Zhang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 67 days.

(21) Appl. No.: 18/190,152

(22) Filed: Mar. 27, 2023

(65) Prior Publication Data

US 2024/0289051 A1    Aug. 29, 2024

(30) Foreign Application Priority Data

Feb. 24, 2023    (CN) .......................... 202310184435.5

(51) Int. Cl.
G06F 3/06    (2006.01)

(52) U.S. Cl.
CPC .......... G06F 3/0659 (2013.01); G06F 3/0604 (2013.01); G06F 3/0679 (2013.01)

(58) Field of Classification Search
CPC ........ G06F 3/0659; G06F 3/06; G06F 3/0604; G06F 3/0679
See application file for complete search history.

(56) References Cited

U.S. PATENT DOCUMENTS 11,269,783 B2 *  3/2022  Hsu .................... G06F 12/0246
11,573,908 B1 *  2/2023  Peng ................... G06F 12/0238
(Continued)

FOREIGN PATENT DOCUMENTS

CN    111813703    10/2020
TW    I579693    4/2017
(Continued)

OTHER PUBLICATIONS

S. J. Kwon, "Address Translation Layer for Byte-Addressable Non-Volatile Memory-Based Solid State Drives," in IEEE Access, vol. 7, p. 73207-73214, 2019.*
(Continued)

*Primary Examiner* — Pierre Michel Bataille
(74) *Attorney, Agent, or Firm* — JCIPRNET

(57) ABSTRACT

A mapping table updating method, a memory storage device and a memory control circuit unit are disclosed. The method includes: receiving, a plurality of operation commands from a host system; performing a first table updating operation according to a first operation command and a third operation command among the operation commands to read and update a first sub-mapping table and a third sub-mapping table from a rewritable non-volatile memory module; and after the first table updating operation is finished, performing a second table updating operation according to a second operation command among the operation commands to read and update a second sub-mapping table from the rewritable non-volatile memory module.

18 Claims, 9 Drawing Sheets

(56) References Cited

U.S. PATENT DOCUMENTS

| | | | | |
|---|---|---|---|---|
| 2017/0083451 | A1* | 3/2017 | Tan | G06F 12/0246 |
| 2017/0199669 | A1* | 7/2017 | Khon | G06F 3/0604 |
| 2017/0315925 | A1* | 11/2017 | Yeh | G06F 12/1009 |
| 2020/0201781 | A1 | 6/2020 | Jain et al. | |
| 2022/0413763 | A1* | 12/2022 | Chien | G06F 3/064 |
| 2024/0028506 | A1* | 1/2024 | Wang | G06F 11/073 |

FOREIGN PATENT DOCUMENTS

| | | |
|---|---|---|
| TW | I584122 | 5/2017 |
| TW | I616807 | 3/2018 |

OTHER PUBLICATIONS

W. Lafi, D. Lattard and A. Jerraya, "High level modelling and performance evaluation of address mapping in NAND flash memory," 2009 16th IEEE International Conference on Electronics, Circuits and Systems - (ICECS 2009), Yasmine Hammamet, Tunisia, 2009, pp. 659-662.*

"Notice of allowance of Taiwan Counterpart Application", issued on Sep. 28, 2023, p. 1-p. 4.

* cited by examiner

MAPPING TABLE UPDATING METHOD, MEMORY STORAGE DEVICE AND MEMORY CONTROL CIRCUIT UNIT

CROSS-REFERENCE TO RELATED APPLICATION

This application claims the priority benefit of China application serial no. 202310184435.5, filed on Feb. 24, 2023. The entirety of the above-mentioned patent application is hereby incorporated by reference herein and made a part of this specification.

BACKGROUND

Technical Field

The disclosure relates to a memory management technology, and in particular relates to a mapping table updating method, a memory storage device, and a memory control circuit unit.

Description of Related Art

As smartphones, tablets, and personal computers have grown rapidly in recent years, the demand of the consumers for storage media has also increased rapidly. Since a rewritable non-volatile memory module (e.g. a flash memory) has the characteristics of data non-volatility, power saving, small size, and having no mechanical structure, it is very suitable for being built in a variety of portable multimedia devices as exemplified above.

In the process of reading and writing data to the rewritable non-volatile memory module, the memory controller reads one or more mapping tables from the rewritable non-volatile memory module to the buffer memory in order to perform data access to the rewritable non-volatile memory module according to the mapping information in the mapping table and correspondingly update the mapping table. Then, the updated mapping table is stored back to the rewritable non-volatile memory module.

Generally speaking, the memory controller reads the required mapping table one by one according to the multiple operation commands in the command buffer. However, once the logic units corresponding to multiple operation commands in the command buffer are dispersed, the memory controller will frequently read and write the mapping table to the rewritable non-volatile memory module, thereby causing additional write amplification (WA). Excessive write amplification severely increases the loss of the rewritable non-volatile memory module, thereby reducing the service life of the rewritable non-volatile memory module.

SUMMARY

The disclosure provides a mapping table updating method, a memory storage device, and a memory control circuit unit, which may effectively improve the updating efficiency of the mapping table.

An exemplary embodiment of the disclosure provides a mapping table updating method for a rewritable non-volatile memory module. The mapping table updating method includes the following operation. A plurality of operation commands are received from a host system. The operation commands include a first operation command, a second operation command, and a third operation command. The first operation command instructs to update data belonging to a first logic unit. The second operation command instructs to update data belonging to a second logic unit. The third operation command instructs to update data belonging to a third logic unit. A first table updating operation is performed according to the first operation command and the third operation command, in which the first table updating operation includes the following operation. A first sub-mapping table and a third sub-mapping table are read from the rewritable non-volatile memory module to a buffer memory according to first address information in a first mapping table. The first sub-mapping table and the third sub-mapping table are updated in the buffer memory according to the first operation command and the third operation command. After the first table updating operation is finished, a second table updating operation is performed according to the second operation command, in which the second table updating operation includes the following operation. A second sub-mapping table is read from the rewritable non-volatile memory module to a buffer memory according to second address information in a second mapping table. The second sub-mapping table is updated in the buffer memory according to the second operation command.

An exemplary embodiment of the disclosure further provides a memory storage device, which includes a connection interface unit, a rewritable non-volatile memory module, and a memory control circuit unit. The connection interface unit is configured to couple to a host system. The memory control circuit unit is coupled to the connection interface unit and the rewritable non-volatile memory module. The memory control circuit unit is configured to include the following operation. A plurality of operation commands are received from a host system. The operation commands include a first operation command, a second operation command, and a third operation command. The first operation command instructs to update data belonging to a first logic unit. The second operation command instructs to update data belonging to a second logic unit. The third operation command instructs to update data belonging to a third logic unit. A first table updating operation is performed according to the first operation command and the third operation command, in which the first table updating operation includes the following operation. A first sub-mapping table and a third sub-mapping table are read from the rewritable non-volatile memory module to a buffer memory according to first address information in a first mapping table. The first sub-mapping table and the third sub-mapping table are updated in the buffer memory according to the first operation command and the third operation command. After the first table updating operation is finished, a second table updating operation is performed according to the second operation command, in which the second table updating operation includes the following operation. A second sub-mapping table is read from the rewritable non-volatile memory module to a buffer memory according to second address information in a second mapping table. The second sub-mapping table is updated in the buffer memory according to the second operation command.

An exemplary embodiment of the disclosure further provides a memory control circuit unit for controlling a rewritable non-volatile memory module. The memory control circuit unit includes a host interface, a memory interface, and a memory management circuit. The host interface is configured to couple to the host system. The memory interface is configured to couple to the rewritable non-volatile memory module. The memory management circuit is coupled to the host interface and the memory interface. The memory management circuit is configured to include the following operation. A plurality of operation commands are received from a host system. The operation commands include a first operation command, a second operation command, and a third operation command. The first operation command instructs to update data belonging to a first logic unit. The second operation command instructs to update data belonging to a second logic unit. The third operation command instructs to update data belonging to a third logic unit. A first table updating operation is performed according to the first operation command and the third operation command, in which the first table updating operation includes the following operation. A first sub-mapping table and a third sub-mapping table are read from the rewritable non-volatile memory module to a buffer memory according to first address information in a first mapping table. The first sub-mapping table and the third sub-mapping table are updated in the buffer memory according to the first operation command and the third operation command. After the first table updating operation is finished, a second table updating operation is performed according to the second operation command, in which the second table updating operation includes the following operation. A second sub-mapping table is read from the rewritable non-volatile memory module to a buffer memory according to second address information in a second mapping table. The second sub-mapping table is updated in the buffer memory according to the second operation command.

Based on the above, after receiving multiple operation commands from the host system, the first table updating operation may be performed according to the first operation command and the third operation command among the operation commands. In the first table updating operation, the first mapping table may be read from the rewritable non-volatile memory module first, and the first mapping table is then updated by reading the first sub-mapping table and the third sub-mapping table from the rewritable non-volatile memory module according to the first address information in the first mapping table. After the first table updating operation is finished, the second table updating operation may be performed according to the second operation command among the operation commands. In the second table updating operation, the second mapping table may be read from the rewritable non-volatile memory module first, and the second mapping table is then updated by reading the second sub-mapping table from the rewritable non-volatile memory module according to the second address information in the second mapping table. In this way, the query efficiency of a single mapping table may be optimized and/or the read and write count of the mapping table may be effectively reduced. In this way, the update efficiency of the mapping table may be effectively improved and/or the write amplification of the rewritable non-volatile memory module may be reduced.

DETAILED DESCRIPTION OF DISCLOSED EMBODIMENTS

Figure 1:
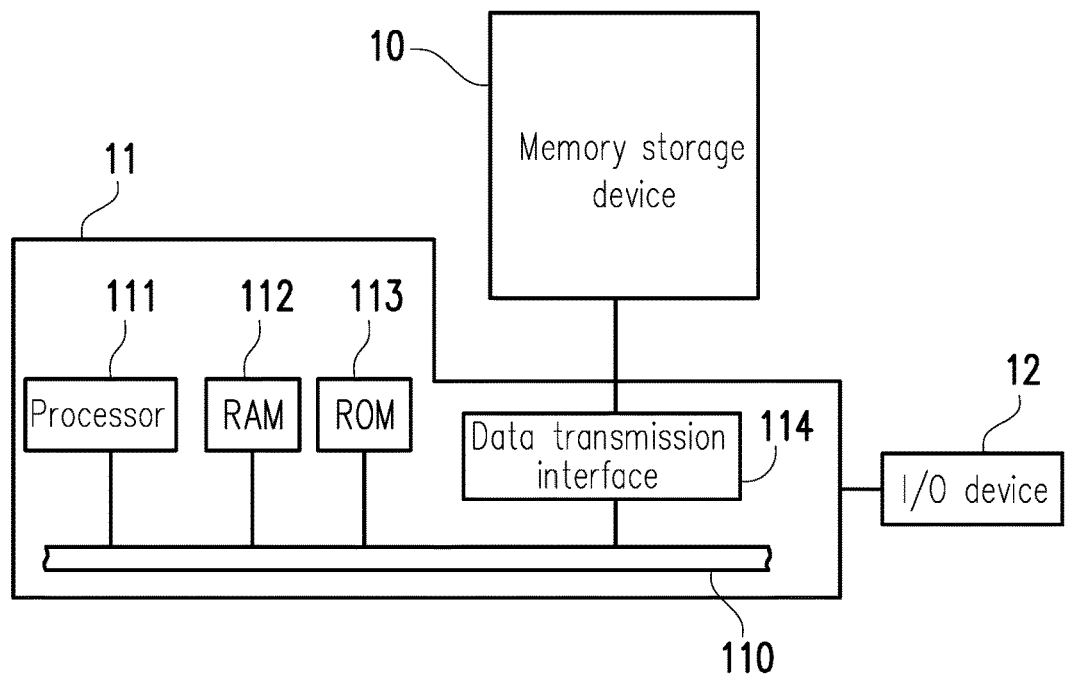
FIG. 1 is a schematic diagram of a host system, a memory storage device, and an input/output (I/O) device according to an exemplary embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

In general, a memory storage device (also referred to as a memory storage system) includes a rewritable non-volatile memory module and a controller (also referred to as a control circuit). The memory storage device may be used with a host system so that the host system may write data to or read data from the memory storage device.

Figure 2:
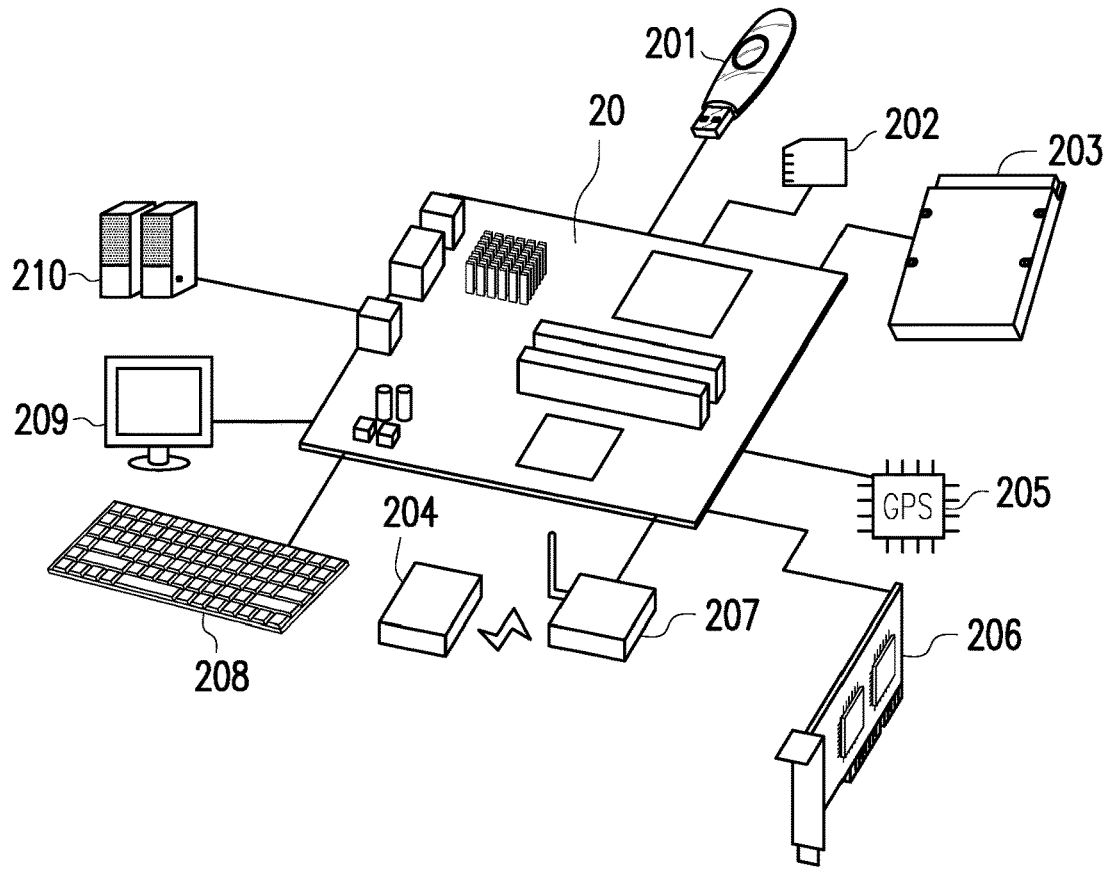
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transfer interface 114. For example, the host system 11 may store data to or read data from the memory storage device 10 via the data transmission interface 114. In addition, the host system 11 may be coupled to an I/O device 12 through the system bus 110. For example, the host system 11 may transmit output signals to or receive input signals from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. The motherboard 20 may be coupled to the memory storage device 10 through the data transmission interface 114 via a wired or wireless connection.

In an exemplary embodiment, the memory storage device 10 may be, for example, a flash drive 201, a memory card 202, a solid state drive (SSD) 203, or a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g.

iBeacon), etc. In addition, the motherboard 20 may also be coupled to various I/O devices, such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include the memory storage device 30 and the host system 31 of FIG. 3.

Figure 3:
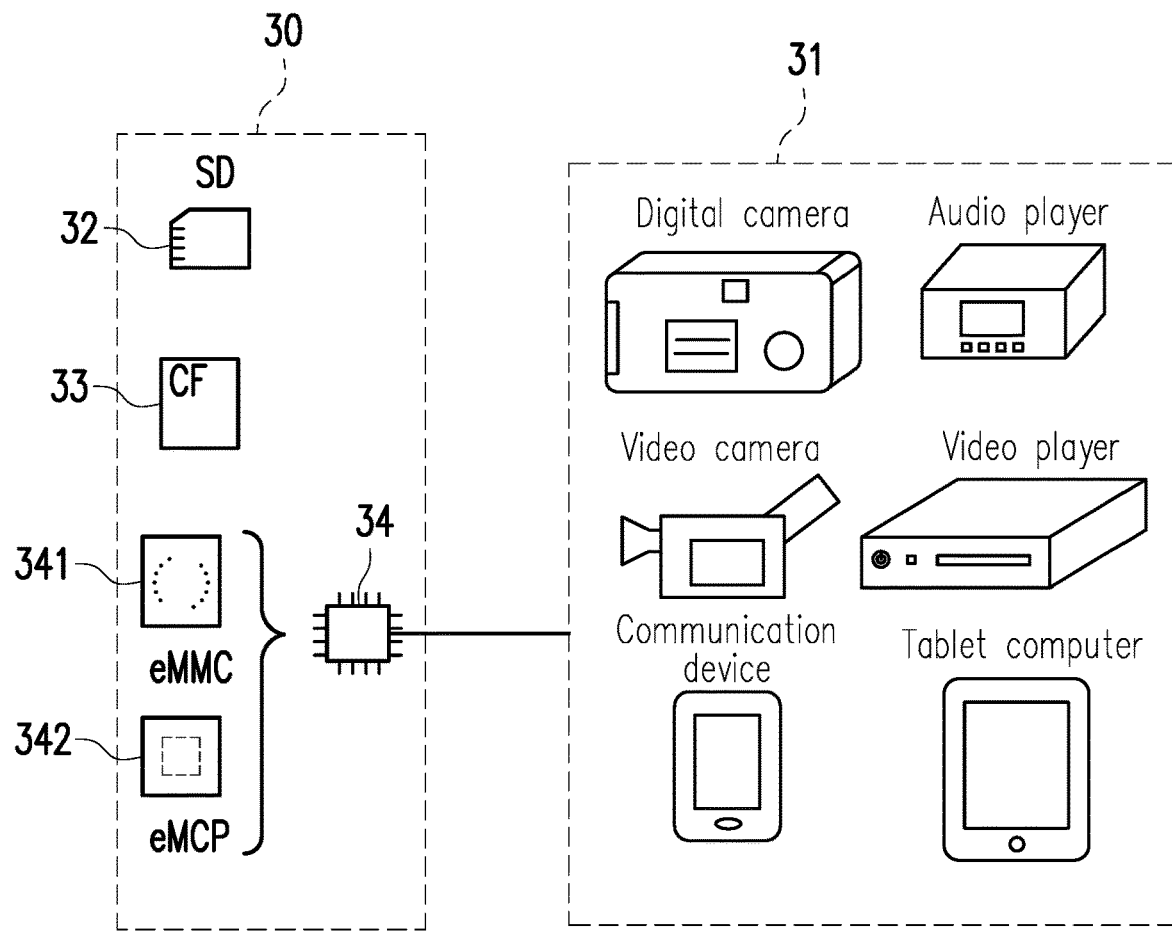
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be used in conjunction with the host system 31 to store data. For example, the host system 31 may be a digital camera, a video camera, a communication device, an audio player, a video player, or a tablet computer system. For example, the memory storage device 30 may be various non-volatile memory storage devices, such as a secure digital (SD) card 32, a compact flash (CF) card 33, or an embedded storage device 34, etc., used in the host system 31. The embedded storage device 34 includes various embedded storage devices that directly couple a memory module to a substrate of the host system, such as an embedded multimedia card (eMMC) 341 and/or an embedded multi-chip package (eMCP) storage device 342, etc.

Figure 4:
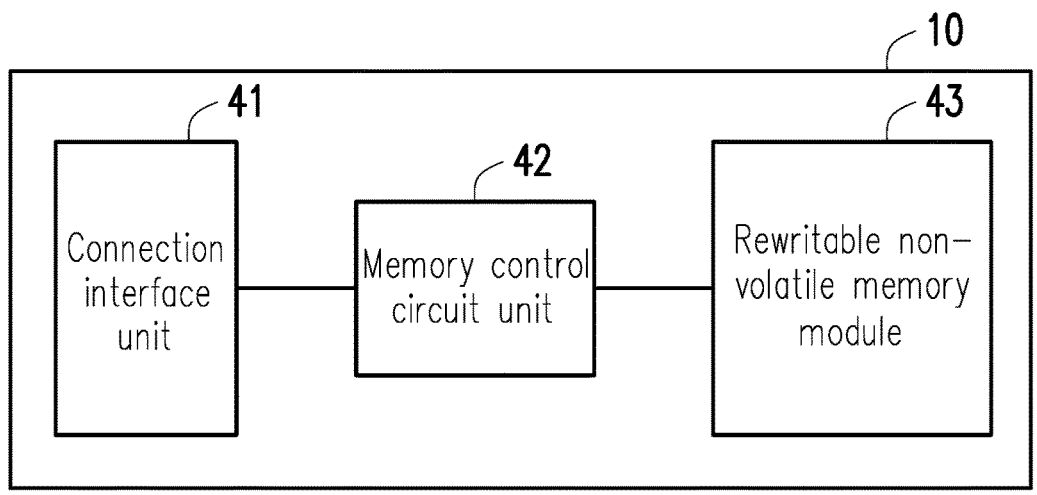
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI Express) standard. In an exemplary embodiment, the connection interface unit 41 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in a chip with the memory control circuit unit 42, or the connection interface unit 41 may be disposed outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in a hardware form or a firmware form and to perform operations such as writing, reading, and erasing of data in the rewritable non-volatile memory module 43 according to the commands of the host system 11.

The rewritable non-volatile memory module 43 is configured to store the data written by the host system 11. The rewritable non-volatile memory module 43 may include a single level cell (SLC) NAND-type flash memory module (i.e., a flash memory that may store 1 bit in one memory cell), multi-level cell (MLC) NAND-type flash memory module (i.e., a flash memory module that may store 2 bits in one memory cell), a triple level cell (TLC) NAND-type flash memory module (i.e., a flash memory module that may store 3 bits in one memory cell), a quad level cell (QLC) NAND-type flash memory module (i.e., a flash memory module that may store 4 bits in one memory cell), other flash memory modules, or other memory modules with the same characteristics.

Each memory cell in the rewritable non-volatile memory module 43 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 43 has multiple storage statuses. By applying a read voltage, it may be determined which storage status a memory cell belongs to, thereby obtaining the one or more bits stored in the memory cell.

In an exemplary embodiment, the memory cells of the rewritable non-volatile memory module 43 may constitute multiple physical programming units, and the physical programming units may constitute multiple physical erasing units. Specifically, memory cells on the same word line may form one or more physical programming units. If each memory cell may store two or more bits, the physical programming units on the same word line may be classified at least as lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the present exemplary embodiment, the physical programming unit is the minimum unit for programming. That is, the physical programming unit is the minimum unit for write data. For example, the physical programming unit may be a physical page or a physical sector. If the physical programming unit is a physical page, then the physical programming unit may include a data bit area and a redundancy bit area. The data bit area includes multiple physical sectors is configured to store user data, and the redundant bit area is configured to store system data (e.g., management data such as error correction codes). In an exemplary embodiment, the data bit area includes 32 physical sectors, and the size of a physical sector is 512 bytes (B). However, in other exemplary embodiments, the data bit area may also include 8, 16, or a greater or lesser number of physical sectors, and the size of each of the physical sectors may also be larger or smaller. On the other hand, the physical erasing unit is the minimum unit for erasing. That is, each of the physical erasing units includes the smallest number of memory cells to be erased together. For example, the physical erasing unit is a physical block.

Figure 5:
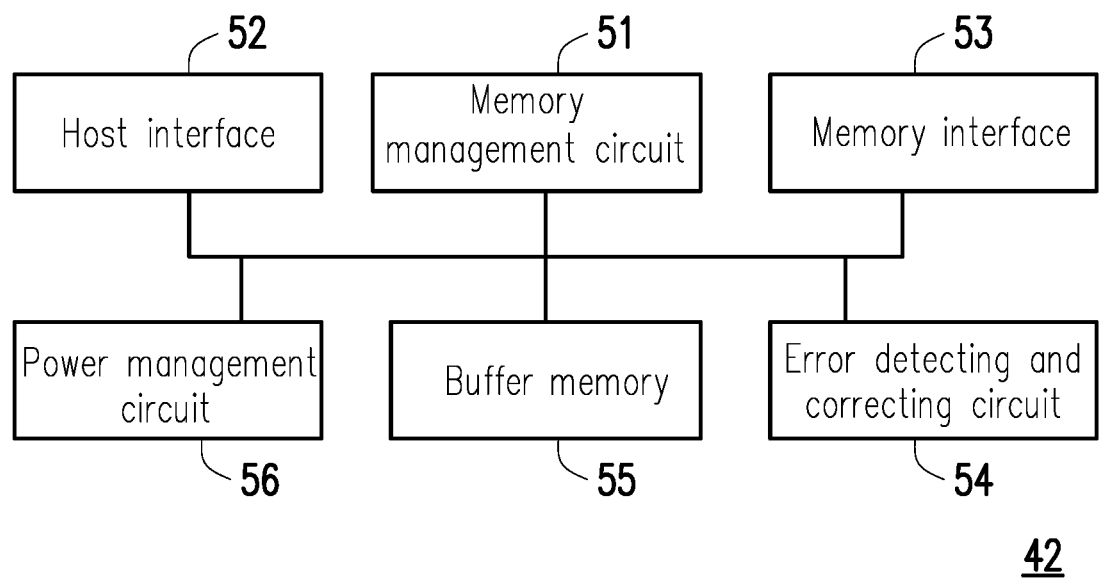
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has multiple control commands, and when the memory storage device 10 operates, the control commands are executed to perform operations such as writing, reading, and erasing data. The following description of the operation of the memory management circuit 51 is equivalent to the description of the operation of the memory control circuit unit 42.

In an exemplary embodiment, the control commands of the memory management circuit 51 are implemented in a firmware form. For example, the memory management circuit 51 has a microprocessor unit (not shown) and a read only memory (not shown), and the control commands are programmed into the read only memory. When the memory storage device 10 operates, the control commands are executed by the microprocessor unit to perform operations such as writing, reading, and erasing data.

In an exemplary embodiment, the control commands of the memory management circuit 51 may also be stored in a specific area of the rewritable non-volatile memory module 43 (for example, a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. Thereafter, the microprocessor unit runs these control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells or a memory cell group of the rewritable non-volatile memory module 43. The memory writing circuit is configured to issue a write command sequence to the rewritable non-volatile memory module 43 to write data into the rewritable non-volatile memory module 43. The memory reading circuit is configured to issue a read command sequence to the rewritable non-volatile memory module 43 to read data from the rewritable non-volatile memory module 43. The memory erasing circuit is configured to issue an erase command sequence to the rewritable non-volatile memory module 43 to erase data from the rewritable non-volatile memory module 43. The data processing circuit is configured to process the data to be written into the rewritable non-volatile memory module 43 and the data read from the rewritable non-volatile memory module 43. The write command sequence, the read command sequence and the erase command sequence may respectively include one or more program codes or command codes for instructing the rewritable non-volatile memory module 43 to perform corresponding writing, reading, and erasing operations. In an exemplary embodiment, the memory management circuit 51 may also issue other types of command sequences to the rewritable non-volatile memory module 43 to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be configured to receive and identify the commands and data transmitted by the host system 11. For example, the commands and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, executing a garbage collection operation, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is configured to execute an error detecting and correcting operation to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Thereafter, when the memory management circuit 51 reads data from the rewritable non-volatile memory module 43, it simultaneously reads the error correcting code and/or the error detecting code corresponding to the data, and the error detecting and correcting circuit 54 executes the error detecting and correcting operation on the read data according to the error correcting code and/or error detecting code.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
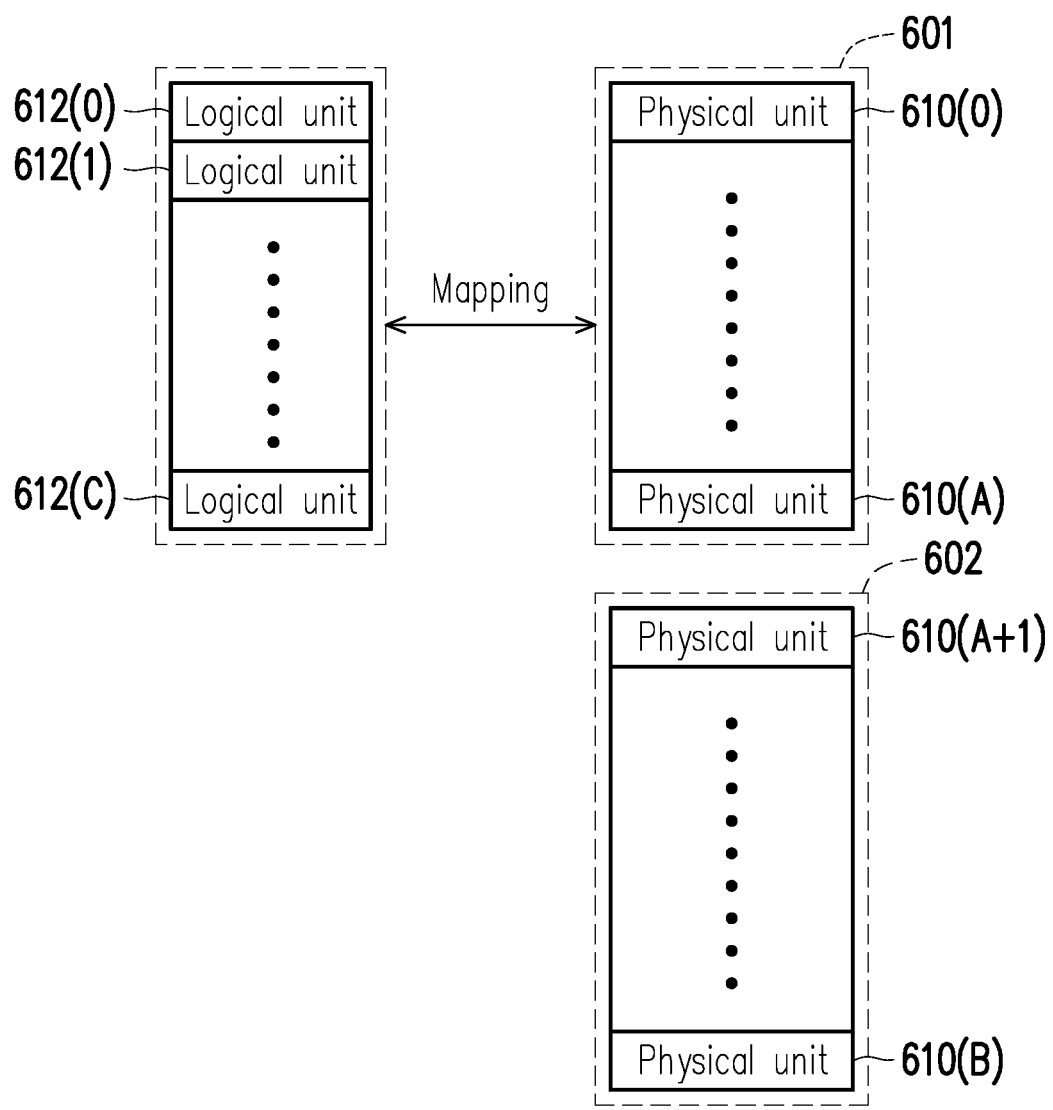
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical units 610(0) to 610(B) in the rewritable non-volatile memory module 43 into a storage area 601 and a spare area 602.

In an exemplary embodiment, a physical unit includes one or more physical programming units. A physical unit may include multiple physical nodes. In an exemplary embodiment, each physical node may store data with a data length of 4 KB. In an exemplary embodiment, each physical node may also store more or less data, which is not limited by the disclosure.

The physical units 610(0) to 610(A) in the storage area 601 are configured to store user data (e.g., user data from the host system 11 of FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units not storing valid data) may be erased. When new data is written, one or more physical units may be extracted from the spare area 602 to store the new data. In an exemplary embodiment, the spare area 602 is also referred to as a free pool.

The logic units 612(0) to 612(C) may be configured in the memory management circuit 51 to map the physical units 610(0) to 610(A) in the storage area 601. In an exemplary embodiment, each of the logic units corresponds to a logical address. For example, a logical address may include one or more logical block addresses (LBA) or other logical management units. In an exemplary embodiment, a logic unit may also correspond to a logical programming unit or be formed by multiple consecutive or non-consecutive logical addresses.

It should be noted that a logic unit may be mapped to one or more physical units. If a certain physical unit is currently mapped by a certain logic unit, it means that the data currently stored in this physical unit includes valid data. On the contrary, if a certain physical unit is not currently mapped by any logic unit, it means that the data currently stored in this physical unit is invalid data.

It should be noted that a logic unit may also be mapped to one or more physical nodes. If a certain physical node is currently mapped by a certain logic unit, it means that the data currently stored in this physical node includes valid data. On the contrary, if a certain physical node is not currently mapped by any logic unit, it means that the data currently stored in this physical node is invalid data.

In an exemplary embodiment, the memory management circuit 51 may record the mapping information (also referred to as the logical to physical mapping information) describing the mapping relationship between logic units and physical units (or physical nodes) in at least one mapping table (also referred to as the logical to physical mapping table). When the host system 11 reads data from the memory storage device 10 or writes data to the memory storage device 10, the memory management circuit 51 may access the rewritable non-volatile memory module 43 according to the information in the mapping table (i.e., the mapping information). In an exemplary embodiment, the memory management circuit 51 uses multi-level mapping to access the mapping table (i.e., the logical to physical mapping table).

Figure 7:
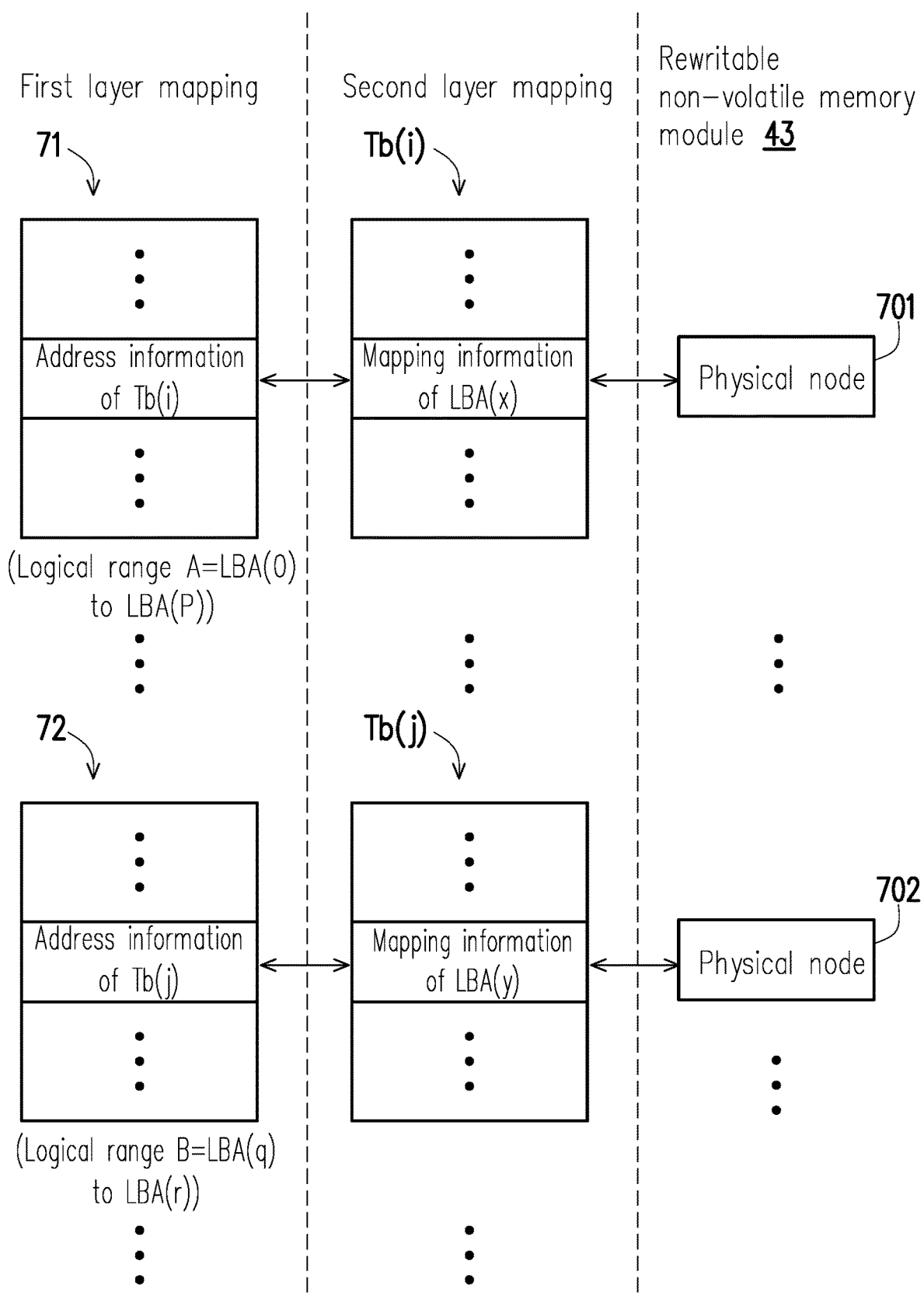
FIG. 7 is a schematic diagram of multi-layer mapping according to an exemplary embodiment of the disclosure.

FIG. 7 is a schematic diagram of multi-layer mapping according to an exemplary embodiment of the disclosure. Referring to FIG. 7, in an exemplary embodiment, the memory management circuit 51 may establish a mapping table 71. The mapping table 71 corresponds to logical range A. For example, the logical range A may include consecutive logic units LBA(0) to LBA(p).

In an exemplary embodiment, the memory management circuit 51 may also establish the sub-mapping table Tb(i). The sub-mapping table Tb(i) may be configured to record mapping information related to the logical range A. For example, the memory management circuit 51 may store the mapping information related to the logical range A in the sub-mapping table Tb(i). For example, the memory management circuit 51 may store the mapping information related to at least one of the logic units LBA(0) to LBA(p) in the sub-mapping table Tb(i).

In an exemplary embodiment, the mapping table 71 may be configured to record address information of the sub-mapping table Tb(i). For example, the memory management circuit 51 may store the address information of the sub-mapping table Tb(i) in the mapping table 71. The address information of the sub-mapping table Tb(i) may reflect the storage address of the sub-mapping table Tb(i) in the rewritable non-volatile memory module 43. For example, the address information of the sub-mapping table Tb(i) may reflect the specific physical unit and/or physical node of the sub-mapping table Tb(i) stored in the rewritable non-volatile memory module 43. Afterwards, the memory management circuit 51 may access the sub-mapping table Tb(i) according to the information in the mapping table 71 (e.g., the address information of the sub-mapping table Tb(i)).

In an exemplary embodiment, the sub-mapping table Tb(i) may be configured to record mapping information of the logic unit LBA(x). For example, the logic unit LBA(x) may be one of the logic units LBA(0) to LBA(p). The memory management circuit 51 may store the mapping information of the logic unit LBA(x) in the sub-mapping table Tb(i). The mapping information of the logic unit LBA(x) may reflect the mapping relationship between the logic unit LBA(x) and specific physical units (or specific physical nodes) in the rewritable non-volatile memory module 43. For example, the mapping information of the logic unit LBA(x) may reflect that the logic unit LBA(x) is mapped to the physical node 701 in the rewritable non-volatile memory module 43. Alternatively, from another point of view, the mapping information of the logic unit LBA(x) may reflect that the data belonging to the logic unit LBA(x) is stored in the physical node 701. Afterwards, the memory management circuit 51 may access the physical node 701 according to the information in the sub-mapping table Tb(i) (e.g., the mapping information of the logic unit LBA(x)).

In an exemplary embodiment, the memory management circuit 51 may also establish a mapping table 72. The mapping table 72 corresponds to logical range B. For example, the logical range B may include consecutive logic units LBA(q) to LBA(r).

In an exemplary embodiment, the memory management circuit 51 may also establish the sub-mapping table Tb(j). The sub-mapping table Tb(j) may be configured to record mapping information related to the logical range B. For example, the memory management circuit 51 may store the mapping information related to the logical range B in the sub-mapping table Tb(j). For example, the memory management circuit 51 may store the mapping information related to at least one of the logic units LBA(q) to LBA(r) in the sub-mapping table Tb(j).

In an exemplary embodiment, the mapping table 72 may be configured to record address information of the sub-mapping table Tb(j). For example, the memory management circuit 51 may store the address information of the sub-mapping table Tb(j) in the mapping table 72. The address information of the sub-mapping table Tb(j) may reflect the storage address of the sub-mapping table Tb(j) in the rewritable non-volatile memory module 43. For example, the address information of the sub-mapping table Tb(j) may reflect the specific physical unit and/or physical node of the sub-mapping table Tb(j) stored in the rewritable non-volatile memory module 43. Afterwards, the memory management circuit 51 may access the sub-mapping table Tb(j) according to the information in the mapping table 72 (e.g., the address information of the sub-mapping table Tb(j)).

In an exemplary embodiment, the sub-mapping table Tb(j) may be configured to record mapping information of the logic unit LBA(y). For example, the logic unit LBA(y) may be one of the logic units LBA(q) to LBA(r). The memory management circuit 51 may store the mapping information of the logic unit LBA(y) in the sub-mapping table Tb(j). The mapping information of the logic unit LBA(y) may reflect the mapping relationship between the logic unit LBA(y) and specific physical units (or specific physical nodes) in the rewritable non-volatile memory module 43. For example, the mapping information of the logic unit LBA(y) may reflect that the logic unit LBA(y) is mapped to the physical node 702 in the rewritable non-volatile memory module 43. Alternatively, from another point of view, the mapping information of the logic unit LBA(y) may reflect that the data belonging to the logic unit LBA(y) is stored in the physical node 702. Afterwards, the memory management circuit 51 may access the physical node 702 according to the information in the sub-mapping table Tb(j) (e.g., the mapping information of the logic unit LBA(y)).

In an exemplary embodiment, the mapping tables 71 and 72 are configured to perform a first layer mapping, and the sub-mapping tables Tb(i) and Tb(j) are configured to perform a second layer mapping. For example, in the first layer mapping, the address information of the sub-mapping table Tb(i) recorded in the mapping table 71 may reflect the mapping relationship between the sub-mapping table Tb(i) and the storage address of the sub-mapping table Tb(i). In the second layer mapping, the mapping information of the logic unit LBA(x) recorded in the sub-mapping table Tb(i) may reflect the mapping relationship between the logic unit LBA(x) and the physical node 701. In an exemplary embodiment, during the process of establishing the first layer mapping, the memory management circuit 51 may correspondingly update the mapping tables 71 and/or 72, and during the process of establishing the second layer mapping, the memory management circuit 51 may correspondingly update the sub-mapping tables Tb(i) and/or Tb(j). In addition, the total number of mapping tables configured in the first layer mapping, the total number of mapping tables configured in the second layer mapping, and the information content recorded in each mapping table may be adjusted according to practical requirements, which is not limited by the disclosure.

In an exemplary embodiment, the memory management circuit 51 may receive one operation command from the host system 11. This operation command may be configured to instruct to read, write, or delete data belonging to the logic unit LBA(x). In response to the operation command, the memory management circuit 51 may send a read command sequence to the rewritable non-volatile memory module 43 according to the logical range A to which the logic unit LBA(x) belongs. The read command sequence may be configured to read the mapping table 71 from the rewritable non-volatile memory module 43. Then, the memory management circuit 51 may temporarily store the read mapping table 71 in the buffer memory 55.

After temporarily storing the mapping table 71 in the buffer memory 55, the memory management circuit 51 may obtain the address information of the sub-mapping table Tb(i) from the mapping table 71. The memory management circuit 51 may send the read command sequence to the rewritable non-volatile memory module 43 according to the address information of the sub-mapping table Tb(i). The read command sequence may be configured to read the sub-mapping table Tb(i) from the rewritable non-volatile memory module 43. Then, the memory management circuit 51 may temporarily store the read sub-mapping table Tb(i) in the buffer memory 55.

In an exemplary embodiment, in response to the operation command being a read command, the memory management circuit 51 may send the read command sequence to the rewritable non-volatile memory module 43 according to the mapping information of the logic unit LBA(x) in the sub-mapping table Tb(i). The read command sequence is configured to instruct the rewritable non-volatile memory module 43 to read data belonging to the logic unit LBA(x) from the physical node 701.

In an exemplary embodiment, in response to the operation command being a write command, the memory management circuit 51 may update (e.g., add or modify) the mapping information of the logic unit LBA(x) in the sub-mapping table Tb(i). For example, the memory management circuit 51 may add mapping information reflecting the mapping relationship between the logic unit LBA(x) and the physical node 701 in the sub-mapping table Tb(i). Meanwhile, the memory management circuit 51 may send a write command sequence to the rewritable non-volatile memory module 43. The write command sequence is configured to instruct the rewritable non-volatile memory module 43 to write the stored data instructed by the write command into the physical node 701.

In an exemplary embodiment, in response to the operation command being a delete command, the memory management circuit 51 may also update (e.g., remove) the mapping information of the logic unit LBA(x) in the sub-mapping table Tb(i). For example, the memory management circuit 51 may remove mapping information reflecting the mapping relationship between the logic unit LBA(x) and the physical node 701 in the sub-mapping table Tb(i). In an exemplary embodiment, removing the mapping information of the logic unit LBA(x) in the sub-mapping table Tb(i) is equivalent to deleting the data belonging to the logic unit LBA(x) from the rewritable non-volatile memory module 43.

In an exemplary embodiment, if the next operation command from the host system 11 is to instruct to read, write, or delete data belonging to the logic unit LBA(y), the memory management circuit 51 may store the mapping table 71 in the buffer memory 55 back to the rewritable non-volatile memory module 43 to release additional storage space in the buffer memory 55. Then, the memory management circuit 51 may send the read command sequence to the rewritable non-volatile memory module 43 according to the logical range B to which the logic unit LBA(y) belongs. The read command sequence may be configured to read the mapping table 72 from the rewritable non-volatile memory module 43. Then, the memory management circuit 51 may temporarily store the read mapping table 72 in the buffer memory 55. Then, the memory management circuit 51 may query the mapping table 72 to perform related table query or update operations, which are not repeated herein.

It should be noted that, in an exemplary embodiment, if the logic units to be accessed instructed by the operation commands received continuously from the host system 11 are located in different logical ranges, and the storage space in the buffer memory 55 for storing the mapping tables (e.g., the mapping tables 71 and/or 72 in FIG. 7) required for performing the first layer mapping is relatively limited, then during the continuous execution of the operation commands, multiple mapping tables required for performing the first layer mapping are frequently read from the rewritable non-volatile memory module 43 and stored back to the rewritable non-volatile memory module 43, thereby causing additional write amplification. In an exemplary embodiment, the memory management circuit 51 may improve the above problems through an optimized mapping table updating mechanism.

Figure 8:
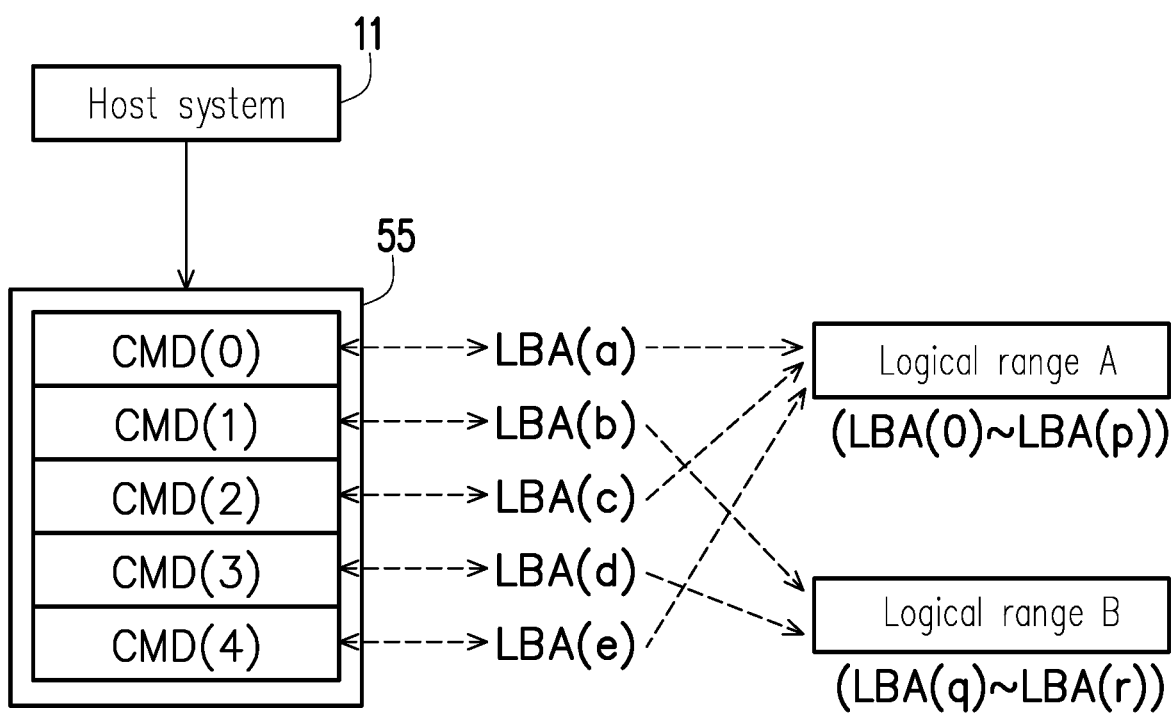
FIG. 8 to FIG. 10 are schematic diagrams of mapping table updating operations according to an exemplary embodiment of the disclosure.
Figure 9:
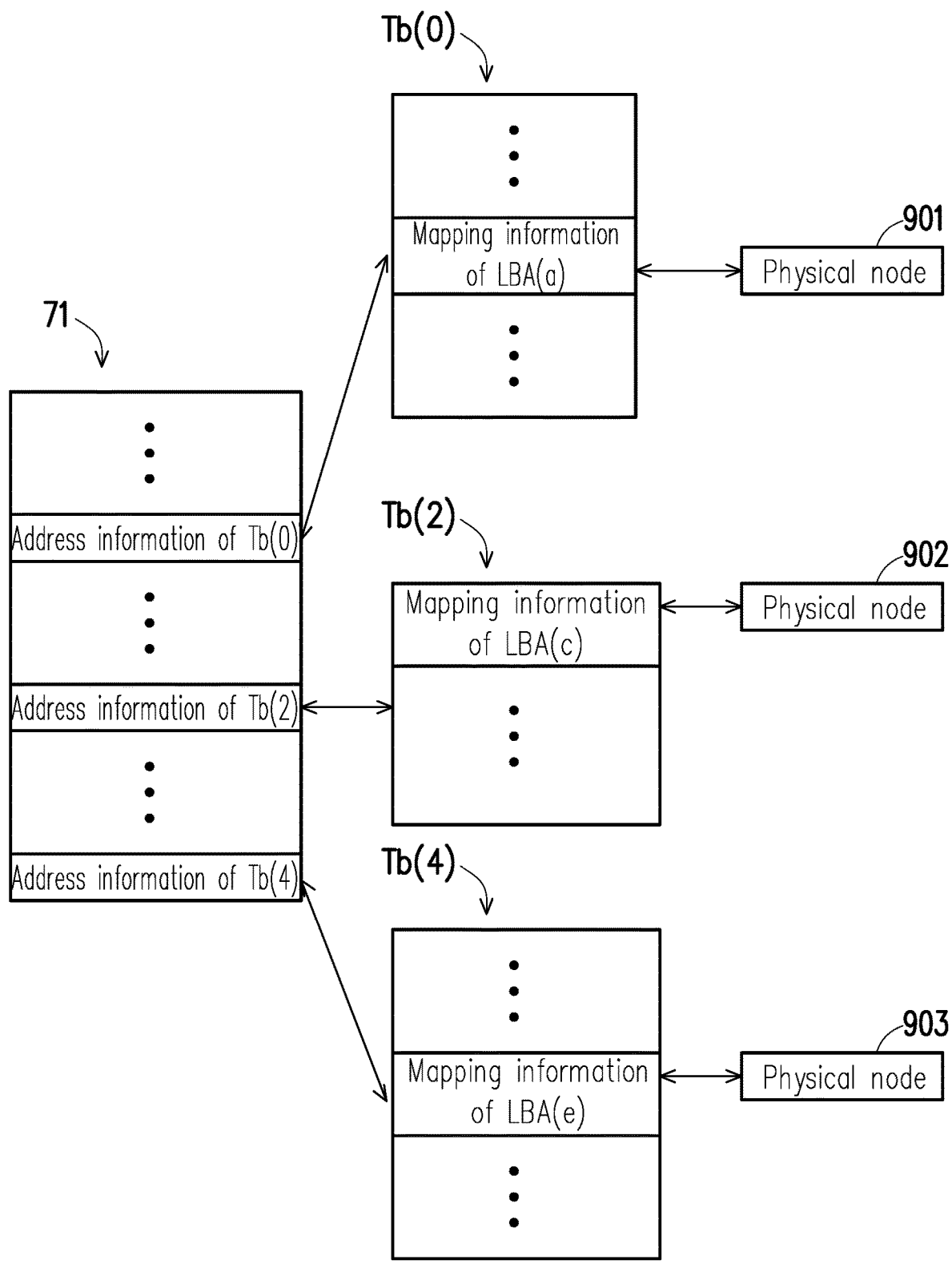
Figure 10:
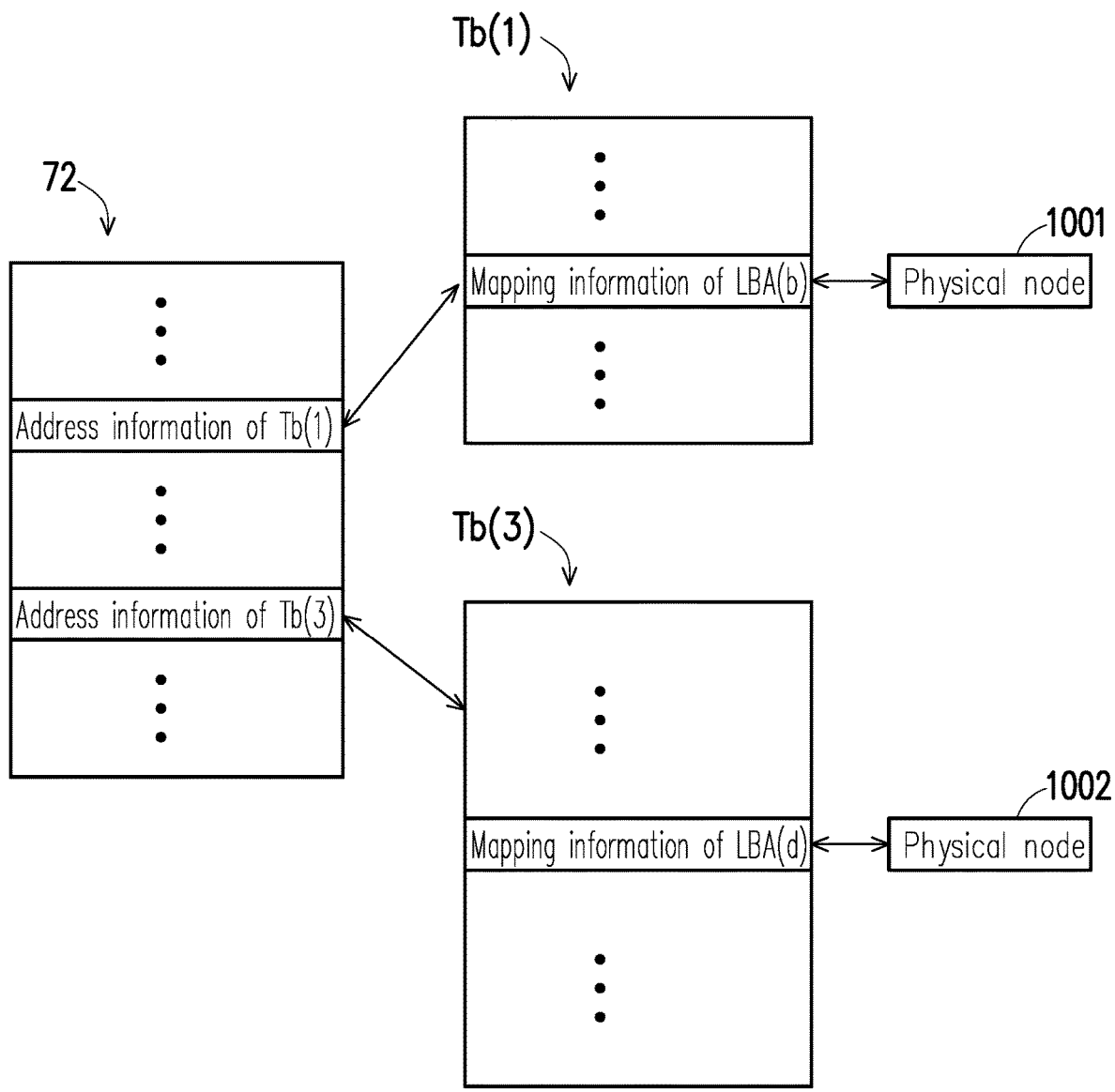

FIG. 8 to FIG. 10 are schematic diagrams of mapping table updating operations according to an exemplary embodiment of the disclosure. Referring to FIG. 8, the memory management circuit 51 may receive multiple operation commands CMD(0) to CMD(4) from the host system 11. Each operation command may instruct to update data belonging to a specific logic unit. For example, the operation commands CMD(0) to CMD(4) may be respectively configured to update the data belonging to the logic units LBA(a) to LBA(e). For convenience of description, it is assumed that the operation commands CMD(0) to CMD(4) are all write commands.

In an exemplary embodiment, the memory management circuit 51 may sequentially temporarily store the operation commands CMD(0) to CMD(4) in a command queue of the buffer memory 55. For example, assuming that the operation command CMD(0) is received first and the operation command CMD(4) is received last, the sequence of the operation commands CMD(0) to CMD(4) in the command queue is as shown in FIG. 8.

In an exemplary embodiment, it is assumed that logic units LBA(a), LBA(c), and LBA(e) belong to the logical range A (i.e., LBA(0) to LBA(p)), and logic units LBA(b) and LBA(d) belong to the logical range B (i.e., LBA(q) to LBA(r)). However, in another exemplary embodiment, the logical ranges in which the logic units LBA(a) to LBA(e) belong may also be adjusted according to practical requirements, which is not limited by the disclosure.

Referring to FIG. 8 and FIG. 9, after receiving the operation commands CMD(0) to CMD(4), the memory management circuit 51 may perform a table updating operation (also referred to as a first table updating operation) according to the operation commands CMD(0), CMD(2), and CMD(4) corresponding to the same logical range (i.e., the logical range A) in the buffer memory 55.

In the first table updating operation, the memory management circuit 51 may read the mapping table 71 (also referred to as the first mapping table) corresponding to the logical range A from the rewritable non-volatile memory module 43 and temporarily store the mapping table 71 in the buffer memory 55. The mapping table 71 may record address information of the sub-mapping tables Tb(0), Tb(2), and Tb(4). After obtaining the mapping table 71, the memory management circuit 51 may read the address information of the sub-mapping tables Tb(0), Tb(2), and Tb(4) from the mapping table 71. The memory management circuit 51 may read the sub-mapping tables Tb(0), Tb(2), and Tb(4) from the rewritable non-volatile memory module 43 according to the address information of the sub-mapping tables Tb(0), Tb(2), and Tb(4). Then, the memory management circuit 51 may temporarily store the sub-mapping tables Tb(0), Tb(2), and Tb(4) in the buffer memory 55.

After the sub-mapping tables Tb(0), Tb(2), and Tb(4) are temporarily stored in the buffer memory 55, the memory management circuit 51 may respectively update (e.g., add or modify) the mapping information of the logic units LBA(a), LBA(c), and LBA(e) in the sub-mapping table Tb(0), Tb(2), and Tb(4) according to the operation command CMD(0), CMD(2), and CMD(4). For example, according to the operation command CMD(0), CMD(2), and CMD(4), the memory management circuit 51 may add the mapping information of the logic unit LBA(a) in the sub-mapping table Tb(0) to reflect the mapping relationship between the logic unit LBA(a) and the physical node 901. The memory management circuit 51 may add the mapping information of the logic unit LBA(c) in the sub-mapping table Tb(2) to reflect the mapping relationship between the logic unit LBA(c) and the physical node 902. The memory management circuit 51 may add the mapping information of the logic unit LBA(e) in the sub-mapping table Tb(4) to reflect the mapping relationship between the logic unit LBA(e) and the physical node 903. Meanwhile, the memory management circuit 51 may send multiple write command sequences to the rewritable non-volatile memory module 43 according to the operation commands CMD(0), CMD(2) and CMD(4). These write command sequences are respectively configured to instruct the rewritable non-volatile memory module 43 to respectively store the data instructed by the operation commands CMD(0), CMD(2), and CMD(4) into the physical nodes 901 to 903.

In an exemplary embodiment, the memory management circuit 51 continuously checks whether there are any unexecuted operation commands corresponding to the logical range A in the buffer memory 55. In response to there is no unexecuted operation command corresponding to the logical range A in the buffer memory 55, the memory management circuit 51 may store the mapping table 71 back to the rewritable non-volatile memory module 43. However, if there are unexecuted operation commands corresponding to logical range A in the buffer memory 55, the memory management circuit 51 may temporarily save the mapping table 71 in the buffer memory 55 and continuously perform the first table updating operation according to the mapping table 71. In addition, after storing the mapping table 71 back into the rewritable non-volatile memory module 43, the memory management circuit 51 may delete the mapping table 71 in the buffer memory 55 to release new storage space.

In an exemplary embodiment, before storing the mapping table 71 back, the memory management circuit 51 may also update the address information of the sub-mapping tables Tb(0), Tb(2), and Tb(4) in the mapping table 71. For example, the address information of the updated sub-mapping tables Tb(0), Tb(2), and Tb(4) may reflect the new storage addresses of the sub-mapping tables Tb(0), Tb(2), and Tb(4) in the rewritable non-volatile memory module 43. Then, the memory management circuit 51 may store the updated mapping table 71 back to the rewritable non-volatile memory module 43. Thereafter, the memory management circuit 51 may store the sub-mapping tables Tb(0), Tb(2), and Tb(4) in the new storage address.

Referring to FIG. 8 and FIG. 10, after finishing the updating of the sub-mapping tables Tb(0), Tb(2), and Tb(4) (i.e., the first table updating operation), the memory management circuit 51 may perform another table updating operation (also referred to as a second table updating operation) according to the operation commands CMD(1) and CMD(3) corresponding to another logical range (i.e., logical range B) in the buffer memory 55.

In the second table updating operation, the memory management circuit 51 may read the mapping table 72 (also referred to as the second mapping table) corresponding to the logical range B from the rewritable non-volatile memory module 43 and temporarily store the mapping table 72 in the buffer memory 55. The mapping table 72 may record address information of the sub-mapping tables Tb(1) and Tb(3). After obtaining the mapping table 72, the memory management circuit 51 may read the address information of the sub-mapping tables Tb(1) and Tb(3) from the mapping table 72. The memory management circuit 51 may read the sub-mapping tables Tb(1) and Tb(3) from the rewritable non-volatile memory module 43 according to the address information of the sub-mapping tables Tb(1) and Tb(3). Then, the memory management circuit 51 may temporarily store the sub-mapping tables Tb(1) and Tb(3) in the buffer memory 55.

After the sub-mapping tables Tb(1) and Tb(3) are temporarily stored in the buffer memory 55, the memory management circuit 51 may respectively update (e.g., add or modify) the mapping information of the logic units LBA(b) and LBA(d) in the sub-mapping table Tb(1) and Tb(3) according to the operation command CMD(1) and CMD(3). For example, according to the operation command CMD(1) and CMD(3), the memory management circuit 51 may add the mapping information of the logic unit LBA(b) in the sub-mapping table Tb(1) to reflect the mapping relationship between the logic unit LBA(b) and the physical node 1001. The memory management circuit 51 may add the mapping information of the logic unit LBA(d) in the sub-mapping table Tb(3) to reflect the mapping relationship between the logic unit LBA(d) and the physical node 1002. Meanwhile, the memory management circuit 51 may send multiple write command sequences to the rewritable non-volatile memory module 43 according to the operation commands CMD(1) and CMD(3). These write command sequences are respectively configured to instruct the rewritable non-volatile memory module 43 to respectively store the data instructed by the operation commands CMD(1) and CMD(3) into the physical nodes 1001 and 1002.

In an exemplary embodiment, the memory management circuit 51 continuously checks whether there are any unexecuted operation commands corresponding to the logical range B in the buffer memory 55. In response to there is no unexecuted operation command corresponding to the logical range B in the buffer memory 55, the memory management circuit 51 may store the mapping table 72 back to the rewritable non-volatile memory module 43. However, if there are unexecuted operation commands corresponding to logical range B in the buffer memory 55, the memory management circuit 51 may temporarily save the mapping table 72 in the buffer memory 55 and continuously perform the second table updating operation according to the mapping table 72.

In an exemplary embodiment, before storing the mapping table 72 back, the memory management circuit 51 may also update the address information of the sub-mapping tables Tb(1) and Tb(3) in the mapping table 72. For example, the address information of the updated sub-mapping tables Tb(1) and Tb(3) may reflect the new storage addresses of the sub-mapping tables Tb(1) and Tb(3) in the rewritable non-volatile memory module 43. Thereafter, the memory management circuit 51 may store the sub-mapping tables Tb(1) and Tb(3) in the new storage address.

In particular, in the exemplary embodiment of FIG. 8, by updating the mapping table for the operation commands corresponding to the same logical range in the buffer memory 55 once or continuously, the access frequency to the mapping table (e.g., the mapping tables 71 and 72) for the first layer mapping may be effectively reduced. In this way, the update efficiency of the mapping table may be effectively improved and/or the write amplification of the rewritable non-volatile memory module may be reduced. In addition, if the capacity of the buffer memory 55 is relatively large, multiple mapping tables (e.g., the mapping tables 71 and 72) for the first layer mapping may also be stored in the buffer memory 55 and used simultaneously, which is not limited by the disclosure.

Figure 11:
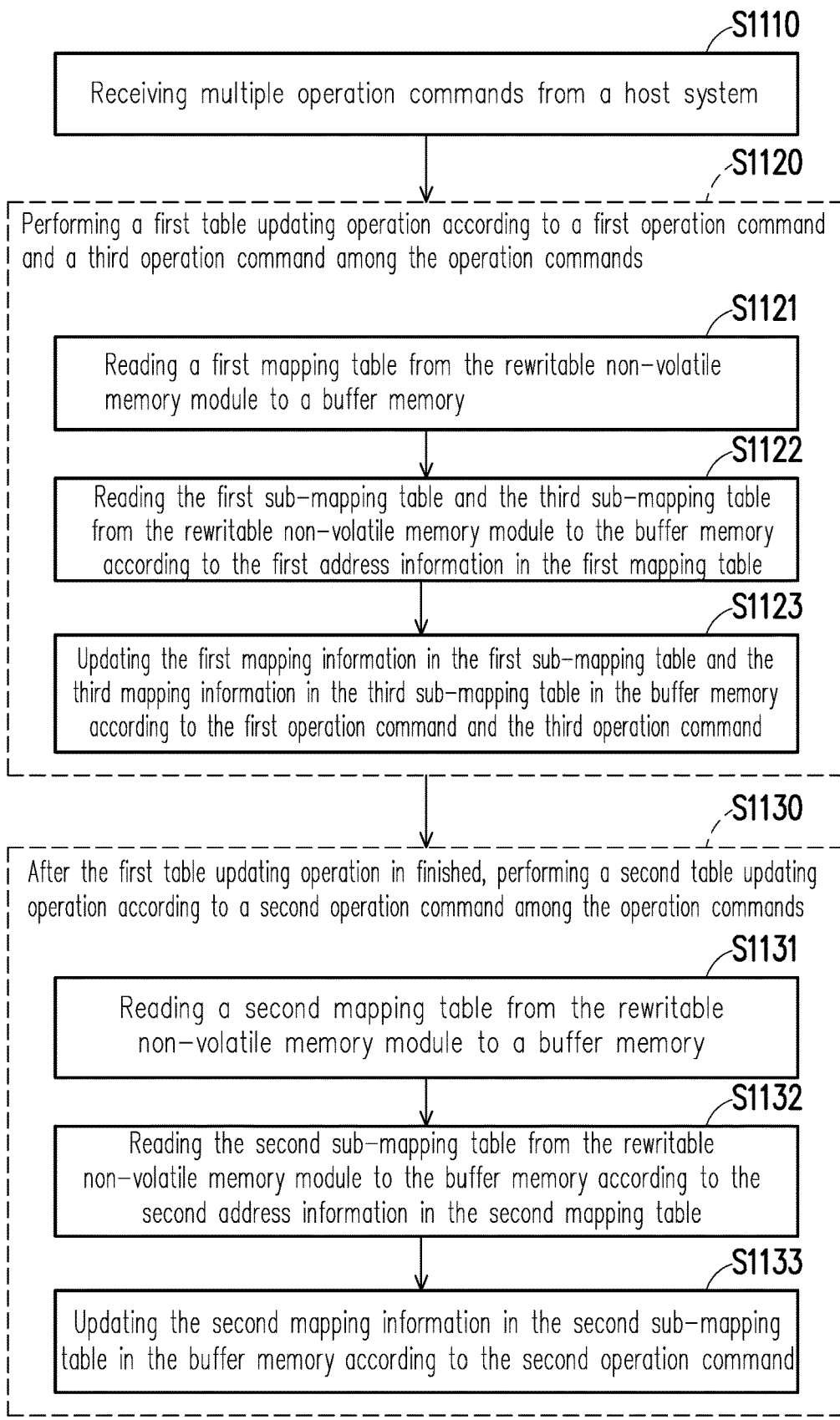
FIG. 11 is a flowchart of a mapping table updating method according to an exemplary embodiment of the disclosure.

FIG. 11 is a flowchart of a mapping table updating method according to an exemplary embodiment of the disclosure. Referring to FIG. 11, in step S1110, multiple operation commands are received from the host system. In step S1120, a first table updating operation is performed according to the first operation command and the third operation command among the operation commands. Step S1120 may include steps S1121 to S1123. In step S1121, the first mapping table is read from the rewritable non-volatile memory module to the buffer memory. In step S1122, the first sub-mapping table and the third sub-mapping table are read from the rewritable non-volatile memory module to the buffer memory according to the first address information in the first mapping table. In step S1123, the first mapping information in the first sub-mapping table and the third mapping information in the third sub-mapping table are updated in the buffer memory according to the first operation command and the third operation command.

After the first table updating operation is completed, in step S1130, a second table updating operation is performed according to the second operation command among the plurality of operation commands. Step S1130 may include steps S1131 to S1133. In step S1131, the second mapping table is read from the rewritable non-volatile memory module to the buffer memory. In step S1132, the second sub-mapping table is read from the rewritable non-volatile memory module to the buffer memory according to the second address information in the second mapping table. In step S1133, the second mapping information in the second sub-mapping table is updated in the buffer memory according to the second operation command.

However, each of the steps in FIG. 11 has been described in detail as above, and will not be repeated herein. It should be noted that each of the steps in FIG. 11 may be implemented as multiple program codes or circuits, and the disclosure is not limited thereto. In addition, the method in FIG. 11 may be used in conjunction with the above-mentioned exemplary embodiments, or may be used alone, and the disclosure is not limited thereto.

To sum up, the mapping table updating method, the memory storage device, and the memory control circuit unit proposed by the exemplary embodiments of the disclosure may update the mapping table for the operation commands corresponding to the same logical range in the buffer memory once or continuously, thereby effectively reducing the access frequency to the mapping table for first layer mapping. In this way, the update efficiency of the mapping table may be effectively improved and/or the write amplification of the rewritable non-volatile memory module may be reduced.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A mapping table updating method for a rewritable non-volatile memory module, the mapping table updating method comprising:
receiving a plurality of operation commands from a host system, wherein the operation commands comprise a first operation command, a second operation command, and a third operation command, the first operation command instructs to update data belonging to a first logic unit, the second operation command instructs to update data belonging to a second logic unit, the third operation command instructs to update data belonging to a third logic unit;
performing a first table updating operation according to the first operation command and the third operation command, wherein the first table updating operation comprises:
reading a first mapping table from the rewritable non-volatile memory module to a buffer memory;
reading a first sub-mapping table and a third sub-mapping table from the rewritable non-volatile memory module to the buffer memory according to first address information in the first mapping table; and
updating the first sub-mapping table and the third sub-mapping table in the buffer memory according to the first operation command and the third operation command; and
performing a second table updating operation after the first table updating operation is finished according to the second operation command, wherein the second table updating operation comprises:
reading a second mapping table from the rewritable non-volatile memory module to the buffer memory;
reading a second sub-mapping table from the rewritable non-volatile memory module to the buffer memory according to second address information in the second mapping table; and
updating the second sub-mapping table in the buffer memory according to the second operation command.

2. The mapping table updating method according to claim 1, wherein the first address information reflects a first storage address of the first sub-mapping table and the third sub-mapping table in the rewritable non-volatile memory module, and the second address information reflects a second storage address of the second sub-mapping table in the rewritable non-volatile memory module.

3. The mapping table updating method according to claim 1, wherein updating the first sub-mapping table in the buffer memory comprises:
updating first mapping information of the first logic unit in the first sub-mapping table, updating the second sub-mapping table in the buffer memory comprises:
updating second mapping information of the second logic unit in the second sub-mapping table, and
updating the third sub-mapping table in the buffer memory comprises:
updating third mapping information of the third logic unit in the third sub-mapping table.

4. The mapping table updating method according to claim 1, wherein the first table updating operation further comprises:
storing the first mapping table back to the rewritable non-volatile memory module after updating the first sub-mapping table and the third sub-mapping table, to release storage space in the buffer memory for storing the second mapping table.

5. The mapping table updating method according to claim 1, wherein the first logic unit and the third logic unit belong to a first logical range, the second logic unit belongs to a second logical range, and the first logical range is different from the second logical range.

6. The mapping table updating method according to claim 1, further comprising:
temporarily storing the operation commands in a command queue of the buffer memory,
wherein in the command queue, a sequence of the second operation command is between the first operation command and the third operation command.

7. A memory storage device, comprising:
a connection interface unit, configured to couple to a host system;
a rewritable non-volatile memory module; and
a memory control circuit unit, coupled to the connection interface unit and the rewritable non-volatile memory module,
wherein the memory control circuit unit is configured to:
receive a plurality of operation commands from the host system, wherein the operation commands comprise a first operation command, a second operation command, and a third operation command, the first operation command instructs to update data belonging to a first logic unit, the second operation command instructs to update data belonging to a second logic unit, the third operation command instructs to update data belonging to a third logic unit;

perform a first table updating operation according to the first operation command and the third operation command, wherein the first table updating operation comprises:

reading a first mapping table from the rewritable non-volatile memory module to a buffer memory;

reading a first sub-mapping table and a third sub-mapping table from the rewritable non-volatile memory module to the buffer memory according to first address information in the first mapping table; and updating the first sub-mapping table and the third sub-mapping table in the buffer memory according to the first operation command and the third operation command; and perform a second table updating operation after the first table updating operation is finished according to the second operation command, wherein the second table updating operation comprises:

reading a second mapping table from the rewritable non-volatile memory module to the buffer memory;

reading a second sub-mapping table from the rewritable non-volatile memory module to the buffer memory according to second address information in the second mapping table; and updating the second sub-mapping table in the buffer memory according to the second operation command.

8. The memory storage device according to claim 7, wherein the first address information reflects a first storage address of the first sub-mapping table and the third sub-mapping table in the rewritable non-volatile memory module, and the second address information reflects a second storage address of the second sub-mapping table in the rewritable non-volatile memory module.

9. The memory storage device according to claim 7, wherein the memory control circuit unit updating the first sub-mapping table in the buffer memory comprises:

updating first mapping information of the first logic unit in the first sub-mapping table, wherein the memory control circuit unit updating the second sub-mapping table in the buffer memory comprises:

updating second mapping information of the second logic unit in the second sub-mapping table, and wherein the memory control circuit unit updating the third sub-mapping table in the buffer memory comprises:

updating third mapping information of the third logic unit in the third sub-mapping table.

10. The memory storage device according to claim 7, wherein the first table updating operation further comprises:

storing the first mapping table back to the rewritable non-volatile memory module after updating the first sub-mapping table and the third sub-mapping table, to release storage space in the buffer memory for storing the second mapping table.

11. The memory storage device according to claim 7, wherein the first logic unit and the third logic unit belong to a first logical range, the second logic unit belongs to a second logical range, and the first logical range is different from the second logical range.

12. The memory storage device according to claim 7, wherein the memory control circuit unit is further configured to:

temporarily store the operation commands in a command queue of the buffer memory, wherein in the command queue, a sequence of the second operation command is between the first operation command and the third operation command.

13. A memory control circuit unit, for controlling a rewritable non-volatile memory module, the memory control circuit unit comprising:

a host interface, configured to couple to a host system;

a memory interface, configured to couple to the rewritable non-volatile memory module; and a memory management circuit, coupled to the host interface and the memory interface, wherein the memory management circuit is configured to:

receive a plurality of operation commands from the host system, wherein the operation commands comprise a first operation command, a second operation command, and a third operation command, the first operation command instructs to update data belonging to a first logic unit, the second operation command instructs to update data belonging to a second logic unit, the third operation command instructs to update data belonging to a third logic unit;

perform a first table updating operation according to the first operation command and the third operation command, wherein the first table updating operation comprises:

reading a first mapping table from the rewritable non-volatile memory module to a buffer memory;

reading a first sub-mapping table and a third sub-mapping table from the rewritable non-volatile memory module to the buffer memory according to first address information in the first mapping table; and updating the first sub-mapping table and the third sub-mapping table in the buffer memory according to the first operation command and the third operation command; and perform a second table updating operation after the first table updating operation is finished according to the second operation command, wherein the second table updating operation comprises:

reading a second mapping table from the rewritable non-volatile memory module to the buffer memory;

reading a second sub-mapping table from the rewritable non-volatile memory module to the buffer memory according to second address information in the second mapping table; and updating the second sub-mapping table in the buffer memory according to the second operation command.

14. The memory control circuit unit according to claim 13, wherein the first address information reflects a first storage address of the first sub-mapping table and the third sub-mapping table in the rewritable non-volatile memory module, and the second address information reflects a second storage address of the second sub-mapping table in the rewritable non-volatile memory module.

15. The memory control circuit unit according to claim 13, wherein the memory management circuit updating the first sub-mapping table in the buffer memory comprises:

updating first mapping information of the first logic unit in the first sub-mapping table, wherein the memory management circuit updating the second sub-mapping table in the buffer memory comprises:

updating second mapping information of the second logic unit in the second sub-mapping table, and wherein the memory management circuit updating the third sub-mapping table in the buffer memory comprises:

updating third mapping information of the third logic unit in the third sub-mapping table.

16. The memory control circuit unit according to claim 13, wherein the first table updating operation further comprises:

storing the first mapping table back to the rewritable non-volatile memory module after updating the first sub-mapping table and the third sub-mapping table, to release storage space in the buffer memory for storing the second mapping table.

17. The memory control circuit unit according to claim 13, wherein the first logic unit and the third logic unit belong to a first logical range, the second logic unit belongs to a second logical range, and the first logical range is different from the second logical range.

18. The memory control circuit unit according to claim 13, wherein the memory management circuit is further configured to:

temporarily store the operation commands in a command queue of the buffer memory, wherein in the command queue, a sequence of the second operation command is between the first operation command and the third operation command.

* * * * *